United States Patent
Yoshitomi et al.

(10) Patent No.: US 7,243,244 B2
(45) Date of Patent: Jul. 10, 2007

(54) MICROPROCESSOR AND OPERATION MODE SWITCHING METHOD FOR THE MICROPROCESSOR

(75) Inventors: Takao Yoshitomi, Kagoshima (JP); Motoki Shimozono, Kagoshima (JP)

(73) Assignee: Fujitsu Limited, Kawasaki (JP)

( * ) Notice: Subject to any disclaimer, the term of this patent is extended or adjusted under 35 U.S.C. 154(b) by 433 days.

(21) Appl. No.: 10/376,617

(22) Filed: Mar. 3, 2003

(65) Prior Publication Data
US 2003/0212917 A1    Nov. 13, 2003

(30) Foreign Application Priority Data
May 8, 2002    (JP)    ............... 2002-132301

(51) Int. Cl.
*G06F 1/32*    (2006.01)
(52) U.S. Cl. ................................... 713/300
(58) Field of Classification Search ............. 713/500, 713/300
See application file for complete search history.

(56) References Cited

U.S. PATENT DOCUMENTS 5,355,503 A * 10/1994 Soffel et al. ............. 713/322
6,128,747 A * 10/2000 Thoulon ................... 713/330
6,184,813 B1 * 2/2001 Abughazaleh et al. ...... 341/144
6,512,402 B2 * 1/2003 Ravid et al. ............... 327/141

FOREIGN PATENT DOCUMENTS

JP    10-091274 A    4/1998

* cited by examiner

*Primary Examiner*—Rehana Perveen
*Assistant Examiner*—Eric Chang
(74) *Attorney, Agent, or Firm*—Arent Fox LLP

(57) ABSTRACT

A microprocessor capable of supplying a stable internal clock signal even at the time of mode switching. A clock supply control circuit is connected between a clock generator circuit (PLL) and synchronous circuits (integer unit, instruction cache, data cache). The clock supply control circuit includes a bus interface unit, OR gates, and first and second delay circuits. With this microprocessor, when operations of the synchronous circuits are to be started, the supply of the internal clock signal from the PLL to the synchronous circuits is started in a time-staggered manner in order of the integer unit, the instruction cache, and the data cache. This serves to suppress noise at the start of operation and to keep the PLL locked, and as a result, the supply of the internal clock signal can be stabilized even at the time of mode switching.

5 Claims, 9 Drawing Sheets

MICROPROCESSOR AND OPERATION MODE SWITCHING METHOD FOR THE MICROPROCESSOR

CROSS-REFERENCE TO RELATED APPLICATIONS

This application is based on, and claims priority to, Japanese Application No. 2002-132301, filed May 8, 2002, in Japan, and which is incorporated herein by reference.

BACKGROUND OF THE INVENTION (1) Field of the Invention

The present invention relates to a microprocessor and an operation mode switching method for the microprocessor, and more particularly, to a microprocessor having a function of mode switching between normal operation mode and low power consumption mode, and to an operation mode switching method for such a microprocessor.

(2) Description of the Related Art

Currently, microprocessors are packaged in various electronic devices such as digital cameras and printers. Operations of such electronic devices are controlled by the microprocessors incorporated therein. In the case of a digital camera, image data acquired by a CCD (Charge-Coupled Device) is compressed into a predetermined data format and recorded in memory under the control of the microprocessor. The microprocessor also controls the auto-focusing function of the digital camera.

Among such microprocessors, there is a type of microprocessor having a function of mode switching between normal operation mode and low power consumption mode. While the electronic device is used normally, for example, the microprocessor operates in the normal operation mode, whereby all functions of the electronic device can be performed under the control of the microprocessor. On the other hand, if the user leaves the electronic device unmanipulated over a fixed period, the electronic device is set in the low power consumption mode. In this case, the microprocessor suspends other functions than the function of detecting the user's input operation, so that the consumption of electric power can be restrained. In the following, the low power consumption mode for restraining the consumption of electric power by the processor is referred to as sleep mode.

FIG. 9 illustrates an exemplary configuration of a conventional microprocessor. As shown in FIG. 9, the microprocessor includes a PLL (Phase Locked Loop) 210, a bus interface unit 220, an integer unit 230, an instruction cache 240, and a data cache 250.

The PLL 210 is input with a system clock signal and outputs an internal clock signal, which is supplied to the bus interface unit 220 as well as to three OR gates 261 to 263. The bus interface unit 220 is further input with a wakeup signal and outputs a sleep signal, which is supplied to the three OR gates 261 to 263. Outputs from the three OR gates 261 to 263 are supplied to the integer unit 230, the instruction cache 240 and the data cache 250, respectively.

In the microprocessor configured as described above, the wakeup signal is normally fixed at high level. When the operation mode is switched from the sleep mode to the normal operation mode, the wakeup signal is set to low level (asserted) for a predetermined period.

On detecting the assertion of the wakeup signal, the bus interface unit 220 determines the timing for transition from the sleep mode to the normal operation mode. During the normal operation mode, the sleep signal is negated (set to low level) by the bus interface unit 220. While the sleep signal is negated, the internal clock signal output from the PLL 210 is supplied directly to the integer unit 230, the instruction cache 240 and the data cache 250.

When supplied with a predetermined input (e.g., "1" is set in a sleep mode register), the microprocessor switches the operation mode to the sleep mode. During the sleep mode, the sleep signal is asserted (set to high level) by the bus interface unit 220. Accordingly, the high-level sleep signal is constantly supplied to the integer unit 230, the instruction cache 240 and the data cache 250. As a result, the internal circuits of the integer unit 230, instruction cache 240 and data cache 250 stop operating. After the operations of the integer unit 230, instruction cache 240 and data cache 250 are stopped, no current flows to these elements, so that the power consumption can be restrained.

Thus, by switching the operation mode of the microprocessor from the normal operation mode to the sleep mode, it is possible to restrain the power consumption.

In the conventional microprocessor, however, when the operation mode is restored to the normal operation mode from the sleep mode, the internal clock signal is supplied simultaneously to the individual circuits in accordance with the input timing of the wakeup signal. Consequently, the overall amount of current flowing through the microprocessor greatly varies, with the result that the ground level changes, causing excessive noise. Such noise can possibly unlock the PLL, which has been operating stably until then, causing malfunction of the microprocessor.

This phenomenon also occurs at the time of transition from the normal operation mode to the sleep mode. If the wakeup signal is input while the PLL is unlocked, the microprocessor malfunctions.

SUMMARY OF THE INVENTION

The present invention was created in view of the above circumstances, and an object thereof is to provide a microprocessor capable of supplying a stable internal clock signal even at the time of mode switching and an operation mode switching method for such a microprocessor.

To achieve the object, there is provided a microprocessor having an operation mode switching function. The microprocessor comprises a clock generator circuit for generating an internal clock signal, a plurality of synchronous circuits operative in synchronism with the clock signal input thereto, and a clock supply control circuit connected between the clock generator circuit and the plurality of synchronous circuits, wherein when operations of the plurality of synchronous circuits are to be started, the clock supply control circuit starts to supply the internal clock signal from the clock generator circuit to the plurality of synchronous circuits in a time-staggered manner.

Also, to achieve the above object, there is provided a microprocessor having an operation mode switching function. The microprocessor comprises a clock generator circuit for generating an internal clock signal, a plurality of synchronous circuits operative in synchronism with the clock signal input thereto, and a clock supply control circuit connected between the clock generator circuit and the plurality of synchronous circuits, wherein when operations of the plurality of synchronous circuits are to be stopped, the clock supply control circuit stops supplying the internal clock signal from the clock generator circuit to the plurality of synchronous circuits in a time-staggered manner.

Further, to achieve the above object, there is provided an operation mode switching method for a microprocessor having a plurality of synchronous circuits operative in synchronism with an internal clock signal. The microprocessor operation mode switching method comprises starting to supply the internal clock signal to part of the plurality of synchronous circuits in response to input of a signal indicating start of operations of the plurality of synchronous circuits, and starting to supply the internal clock signal to remaining part of the synchronous circuits after a lapse of a predetermined delay time from the input of the signal.

To achieve the above object, moreover, there is provided an operation mode switching method for a microprocessor having a plurality of synchronous circuits operative in synchronism with an internal clock signal. The microprocessor operation mode switching method comprises stopping supply of the internal clock signal to part of the plurality of synchronous circuits in response to input of a signal indicating stop of operations of the plurality of synchronous circuits, and stopping supply of the internal clock signal to remaining part of the synchronous circuits after a lapse of a predetermined delay time from the input of the signal.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will be hereinafter described with reference to the drawings.

[First Embodiment]

Figure 1:
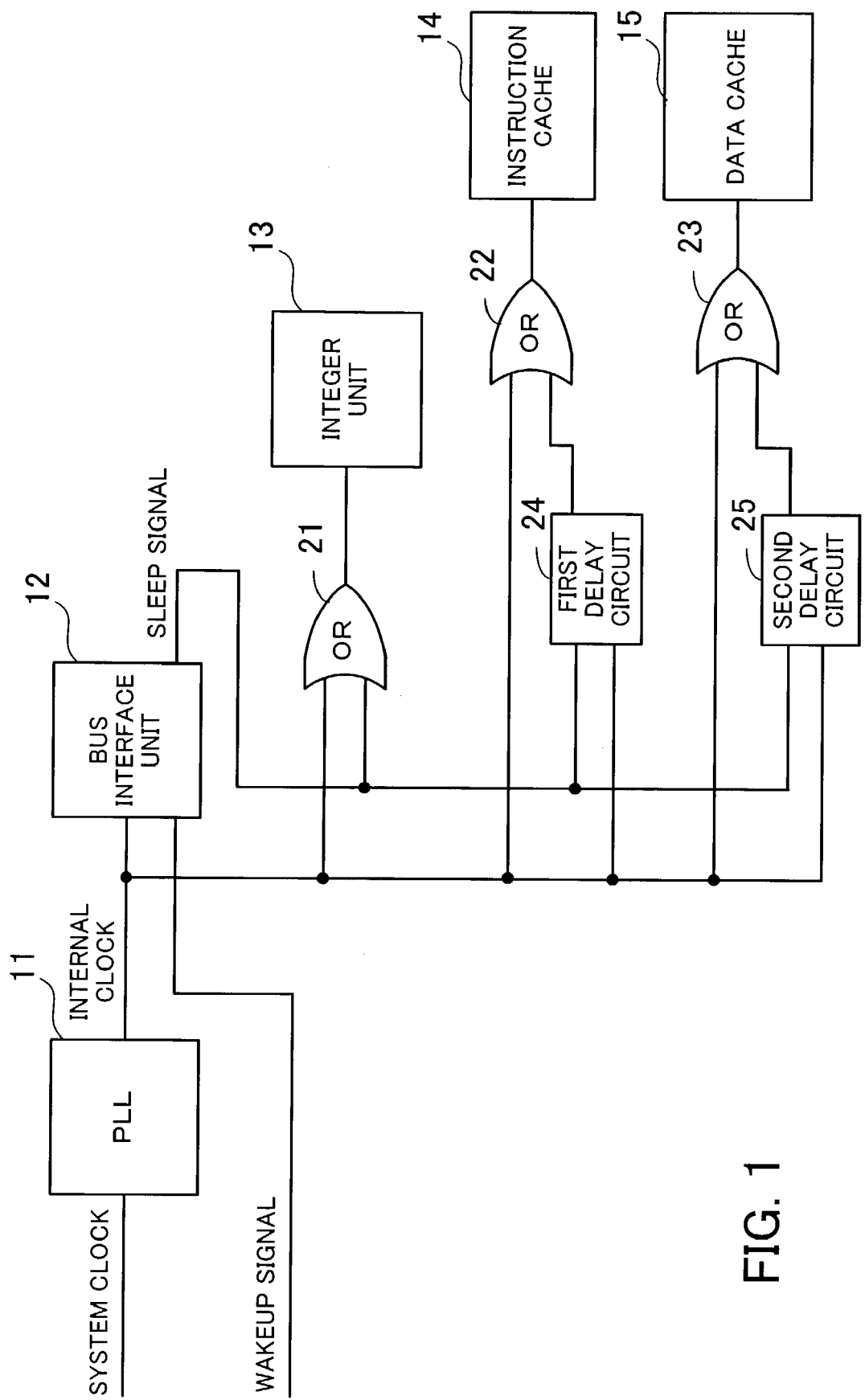
FIG. 1 is a diagram illustrating a circuit configuration of a microprocessor according to a first embodiment.

FIG. 1 illustrates the circuit configuration of a microprocessor according to a first embodiment. As shown in FIG. 1, the microprocessor includes a PLL 11, a bus interface unit 12, an integer unit 13, an instruction cache 14, and a data cache 15.

The PLL 11 is a circuit for generating an internal clock signal with a predetermined frequency based on a system clock signal, and is also called phase locked loop circuit. Namely, the PLL 11 functions as a clock generator circuit for generating the internal clock signal. The bus interface unit 12 is a circuit for connecting external and internal buses. The integer unit 13 is an arithmetic circuit for performing integer computations. The instruction cache 14 is a cache memory for storing instructions, and the data cache 15 is a cache memory for storing data. The integer unit 13, the instruction cache 14 and the data cache 15 are circuits (synchronous circuits) that operate within the microprocessor in synchronism with the internal clock signal.

The PLL 11 is input with the system clock signal, and outputs the internal clock signal, which is supplied to the bus interface unit 12. The internal clock signal output from the PLL 11 is also supplied to three OR gates 21 to 23, a first delay circuit 24 and a second delay circuit 25. The OR gates 21 to 23 are each a logic circuit for outputting a logical sum of input signals. The first and second delay circuits 24 and 25 each output an input signal after delaying the signal for a predetermined period. The first delay circuit 24 delays change of an input sleep signal for a time corresponding to one cycle of the internal clock signal. The second delay circuit 25 delays change of the input sleep signal for a time corresponding to two cycles of the internal clock signal.

The bus interface unit 12 is further input with a wakeup signal and outputs the sleep signal. The sleep signal is a high-active signal (which is active when set to high level) and is supplied to the OR gate 21 and the first and second delay circuits 24 and 25.

The output of the OR gate 21 is supplied to the integer unit 13. The output of the first delay circuit 24 is supplied to the OR gate 22, the output of which is supplied to the instruction cache 14. The output of the second delay circuit 25 is supplied to the OR gate 23 whose output is supplied to the data cache 15.

In the microprocessor configured as described above, the system clock signal is continuously input to the PLL 11 from outside. The PLL 11 outputs the internal clock signal with a predetermined frequency based on the system clock signal.

The bus interface unit 12 of the microprocessor is input with the wakeup signal which specifies an operation mode. The level of the wakeup signal is usually maintained at high level. When the microprocessor is to be operated in normal operation mode, the wakeup signal is asserted (set to low level) for a predetermined period (e.g., a period corresponding to two or more cycles of the system clock signal from a circuit external to the microprocessor). If the wakeup signal is thus asserted for the predetermined period, the sleep signal is negated, so that the internal clock signal is supplied from the PLL 11 to the integer unit 13, the instruction cache 14 and the data cache 15 in a time-staggered manner by the cooperative action of the bus interface unit 12, OR gates 21 to 23 and first and second delay circuits 24 and 25.

Also, when the microprocessor is supplied with an external input indicating transition to sleep mode, the sleep signal is asserted, so that the supply of the internal clock signal from the PLL 11 to the integer unit 13, the instruction cache 14 and the data cache 15 is stopped in a time-staggered manner by the cooperative action of the bus interface unit 12, OR gates 21 to 23 and first and second delay circuits 24 and 25. As a result of the input indicating transition to the sleep mode, "1" is set in a predetermined register (sleep mode register) within the microprocessor. In this case, the value in the sleep mode register is initialized (set to "0") after the transition to the sleep mode.

With the configuration described above, the timing for supplying the clock signal to the individual synchronous circuits (the integer unit 13, the instruction cache 14 and the data cache 15) is controlled. Namely, the bus interface unit 12, the OR gates 21 to 23 and the first and second delay circuits 24 and 25 constitute a clock supply control circuit.

The following describes operations of the individual circuits when the operation mode of the microprocessor is switched from the sleep mode to the normal operation mode.

If the wakeup signal is asserted for the predetermined period, the sleep signal is negated (deactivated) by the bus interface unit 12. At this time, the OR gate 21 is supplied with the low-level sleep signal and the internal clock signal output from the PLL 11. As a result, the internal clock signal is output from the OR gate 21 and supplied to the integer unit 13. The integer unit 13 starts to operate as soon as it is supplied with the internal clock signal.

Also, when the sleep signal is negated, the first delay circuit 24 is supplied with the low-level sleep signal and the internal clock signal output from the PLL 11. The first delay circuit 24 negates its output signal after a lapse of a time corresponding to one cycle of the internal clock signal from the negation of the sleep signal. As a result, the internal clock signal is output from the OR gate 22 after a lapse of one clock cycle from the negation of the sleep signal, and is supplied to the instruction cache 14. The instruction cache 14 starts to operate as soon as it is supplied with the internal clock signal.

Further, when the sleep signal is negated, the second delay circuit 25 is supplied with the low-level sleep signal and the internal clock signal output from the PLL 11. The second delay circuit 25 negates its output signal after a lapse of a time corresponding to two cycles of the internal clock signal from the negation of the sleep signal. As a result, the internal clock signal is output from the OR gate 23 after a lapse of two clock cycles from the negation of the sleep signal, and is supplied to the data cache 15. The data cache 15 starts to operate as soon as it is supplied with the internal clock signal.

In this manner, when the operation mode is switched to the normal operation mode, the internal clock signal can be supplied to the integer unit 13, the instruction cache 14 and the data cache 15 in a manner staggered in time by one clock cycle each. The individual circuits operate in synchronism with the internal clock signal and, accordingly, start to operate from the time when the supply of the internal clock signal is started. Consequently, the operation start timing for the individual circuits is staggered, thus making it possible to lessen change in the overall amount of current flowing through the chip at the time of mode switching. Since change in the amount of current is small, unwanted noise is not produced, whereby unlocking of the PLL 11 is prevented.

The following describes operations of the individual circuits when the operation mode of the microprocessor is switched from the normal operation mode to the sleep mode.

When the microprocessor is supplied with an input indicating transition to the sleep mode ("1" is set in the sleep mode register), the sleep signal is asserted (activated) by the bus interface unit 12. At this time, the OR gate 21 is supplied with the high-level sleep signal and the internal clock signal output from the PLL 11. As a result, the high-level sleep signal is output from the OR gate 21 and supplied to the integer unit 13. The integer unit 13 stops its operation since it is constantly supplied with the high-level sleep signal, instead of the internal clock signal.

Also, when the sleep signal is asserted, the first delay circuit 24 is supplied with the high-level sleep signal and the internal clock signal output from the PLL 11. The first delay circuit 24 asserts its output signal after a lapse of a time corresponding to one cycle of the internal clock signal from the assertion of the sleep signal. As a result, the high-level sleep signal is output from the OR gate 22 after a lapse of one clock cycle from the assertion of the sleep signal, and is supplied to the instruction cache 14. The instruction cache 14 stops its operation since it is constantly supplied with the high-level sleep signal, instead of the internal clock signal.

Further, when the sleep signal is asserted, the second delay circuit 25 is supplied with the high-level sleep signal and the internal clock signal output from the PLL 11. The second delay circuit 25 asserts its output signal after a lapse of a time corresponding to two cycles of the internal clock signal from the assertion of the sleep signal. As a result, the high-level sleep signal is output from the OR gate 23 after a lapse of two clock cycles from the assertion of the sleep signal, and is supplied to the data cache 15. The data cache 15 stops its operation since it is constantly supplied with the high-level sleep signal, instead of the internal clock signal.

Thus, when the operation mode is switched to the sleep mode, the supply of the internal clock signal to the integer unit 13, the instruction cache 14 and the data cache 15 can be stopped in a manner staggered in time by one clock cycle each. Consequently, the operation stop timing for the individual circuits is staggered, thus making it possible to lessen change in the overall amount of current flowing through the chip at the time of operation mode switching. Since change in the amount of current is small, unwanted noise is not produced, whereby unlocking of the PLL is prevented. As a result, a stable internal clock signal can be supplied to the internal circuits even at the time of operation mode switching, whereby the operation of the microprocessor can be stabilized.

Internal configurations of the delay circuits will be now described.

Figure 2:
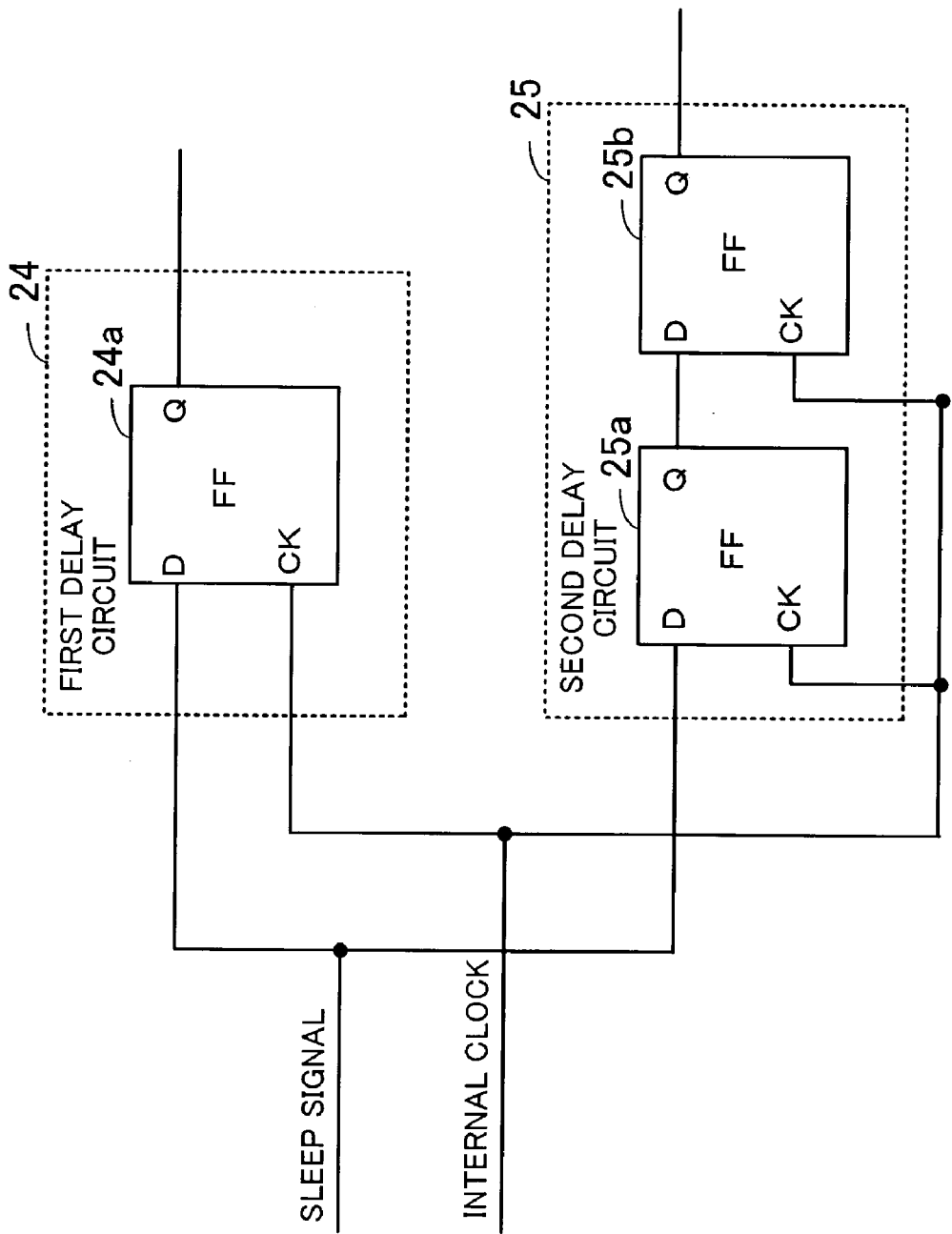
FIG. 2 is a diagram illustrating internal configurations of delay circuits.

FIG. 2 illustrates the internal configurations of the delay circuits. The first and second delay circuits include flip-flops corresponding in number to the respective delay times (numbers of cycles of the internal clock signal).

Specifically, the first delay circuit 24 is constituted by one flip-flop 24a, while the second delay circuit 25 is constituted by two flip-flops 25a and 25b. These flip-flops 24a, 25a and 25b are each a flip-flop called D (Delay)-FF (Flip-Flop). A D-FF admits the value input to the D terminal at the leading edge of a clock pulse, and outputs the value from the Q terminal.

The sleep signal is input to the D terminal of the flip-flop 24a of the first delay circuit 24 and the D terminal of the flip-flop 25a of the second delay circuit 25. The internal clock signal is input to the clock (CK) terminal of the flip-flop 24a of the first delay circuit 24 and the clock (CK) terminals of the two flip-flops 25a and 25b of the second delay circuit 25.

The Q terminal of the flip-flop 24a of the first delay circuit 24 is connected to the OR gate 22 shown in FIG. 1. In the second delay circuit 25, the Q terminal of the flip-flop 25a is connected to the D terminal of the flip-flop 25b whose Q terminal is connected to the OR gate 23 shown in FIG. 1.

When the operation mode is switched, the sleep signal is negated or asserted synchronously with the leading edge of an internal clock pulse. In synchronism with the leading edge of the internal clock pulse of the next cycle, the sleep signal is admitted into the flip-flops 24a and 25a and output from the respective Q terminals. Then, in synchronism with the leading edge of the internal clock pulse of the succeeding cycle, the sleep signal is admitted to the flip-flop 25b and output from the Q terminal.

Thus, by using D-FFs, it is possible to construct delay circuits for delaying the sleep signal for desired periods of time.

Figure 3:
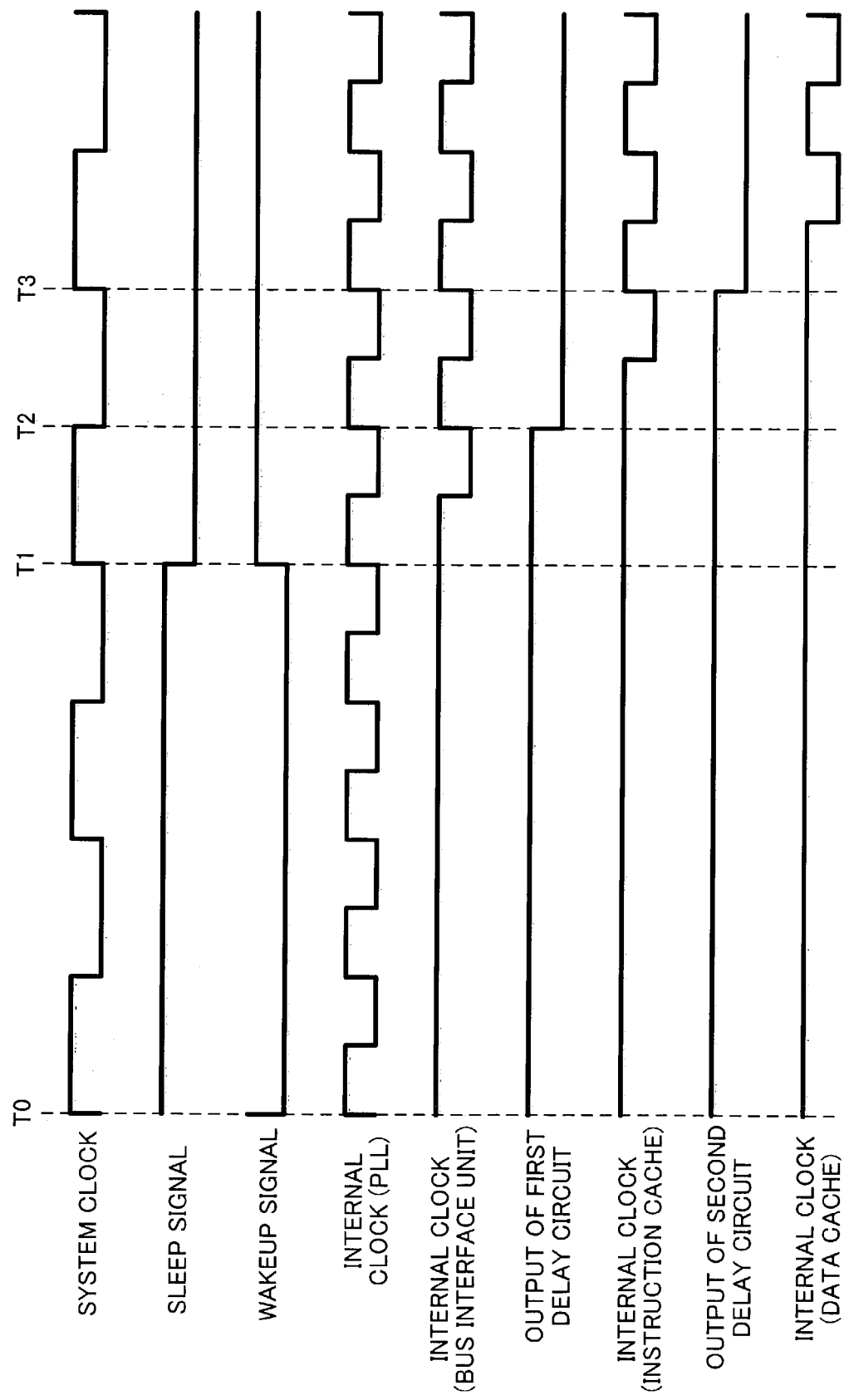
FIG. 3 is a timing chart of the microprocessor according to the first embodiment.

FIG. 3 is a timing chart of the microprocessor according to the first embodiment. In FIG. 3 are illustrated, from the top downward, the system clock signal, the sleep signal, the wakeup signal, the internal clock signal of the PLL 11, the internal clock signal of the bus interface unit 12, the output of the first delay circuit 24, the internal clock signal of the instruction cache 14, the output of the second delay circuit 25, and the internal clock signal of the data cache 15.

The internal clock signal of the PLL 11 is a clock signal generated within the PLL 11 in phase with the system clock signal. The internal clock signal of the bus interface unit 12 is a clock signal which is supplied to those parts of internal circuits constituting the bus interface unit 12 which operate only during the normal operation mode. Among the internal circuits constituting the bus interface unit 12, circuits such as a circuit for detecting the input of the wakeup signal need to operate also during the sleep mode, and thus are constantly supplied with the internal clock signal output from the PLL 11. The integer unit 13 is supplied with an internal clock signal identical with that of the bus interface unit 12.

The internal clock signal of the instruction cache 14 is a clock signal which is supplied to internal circuits of the instruction cache 14. The internal clock signal of the data cache 15 is a clock signal which is supplied to internal circuits of the data cache 15.

In the example illustrated in FIG. 3, the internal clock signal of the PLL 11 has a cycle half that of the system clock signal, and it is also assumed that before time T1, the operation mode of the microprocessor is set in the sleep mode. The wakeup signal remains at high level except when an instruction to switch to the normal operation mode is input. During the sleep mode, the sleep signal, the internal clock signal of the bus interface unit 12, the output of the first delay circuit 24, the internal clock signal of the instruction cache 14, the output of the second delay circuit 25 and the internal clock signal of the data cache 15 are all at high level.

At time T0, the level of the wakeup signal is changed from high to low. If this state continues for a time corresponding to two cycles of the system clock signal, the bus interface unit 12 recognizes the instruction to switch to the normal operation mode.

At time T1, the level of the wakeup signal is changed from low to high, and simultaneously with this, the level of the sleep signal is changed from high to low (negated) by the bus interface unit 12. Also, the internal clock signal of the bus interface unit 12 turns into a signal identical with the internal clock signal from the PLL 11. At this point of time, the outputs of the first and second delay circuits 24 and 25 remain at high level, and accordingly, the internal clock signals of the instruction cache 14 and data cache 15 also remain at high level.

At time T2, the output of the first delay circuit 24 changes to low level, whereupon the internal clock signal of the instruction cache 14 turns into a signal identical with the internal clock signal from the PLL 11. At this point of time, the output of the second delay circuit 25 still remains at high level, and accordingly, the internal clock signal of the data cache 15 remains at high level.

At time T3, the output of the second delay circuit 25 changes to low level, whereupon the internal clock signal of the data cache 15 turns into a signal identical with the internal clock signal from the PLL 11.

Thus, when the mode of the microprocessor is switched (e.g., when the mode is restored to the normal operation mode from the sleep mode (low power consumption mode)), the clock supply timing for the individual circuits (modules) in the processor can be staggered in time. As a result, fluctuation of noise caused in the ground level at the time of mode switching can be restrained, and thus unlocking of the PLL is prevented. Namely, change in the current flowing through the microprocessor is dispersed to thereby restrain sudden change (noise) of the ground level. Consequently, malfunction of the microprocessor, which is caused in the conventional processor at the time of cancellation of the sleep mode due to unlocking of the PLL, can be prevented by using the configuration of the first embodiment.

In the first embodiment, when the operation mode is restored to the normal operation mode from the sleep mode, the supply of the internal clock signal is started in order of the integer unit 13, the instruction cache 14 and the data cache 15 in a manner staggered in time by one internal clock cycle each. This order of starting the circuits is in agreement with the order of occurrence of processes within the microprocessor.

Specifically, at the start of operation of the microprocessor, the integer unit 13 starts first. Then, after fetching an instruction from the instruction cache 14, the integer unit 13 accesses the data cache 15 to acquire data necessary for executing the process in accordance with the fetched instruction. Thus, in the processor, process takes place in order of the integer unit 13, the instruction cache 14 and the data cache 15. The processing of the processor therefore never stagnates even if the supply of the internal clock signal to the instruction cache 14 is started after a delay of one clock cycle from the start of the supply of the internal clock signal to the integer unit 13, and the supply of the internal clock signal to the data cache 15 is started after a further delay of one clock cycle.

[Second Embodiment]

According to a second embodiment, the control of delaying the supply timing for the internal clock signal is carried out only when the operation mode switches to the normal operation mode. The influence of malfunction caused due to unlocking of the PLL is greater when the operation mode switches to the normal operation mode. When the operation mode switches to the sleep mode, on the other hand, operations of all circuits may be immediately stopped, whereby the consumption of electric power can be reduced. Even if the PLL becomes unlocked at the time of transition to the sleep mode, mode switching may be inhibited for a fixed period after the transition to the sleep mode, so that the PLL can be restored to the locked state during the sleep mode.

Figure 4:
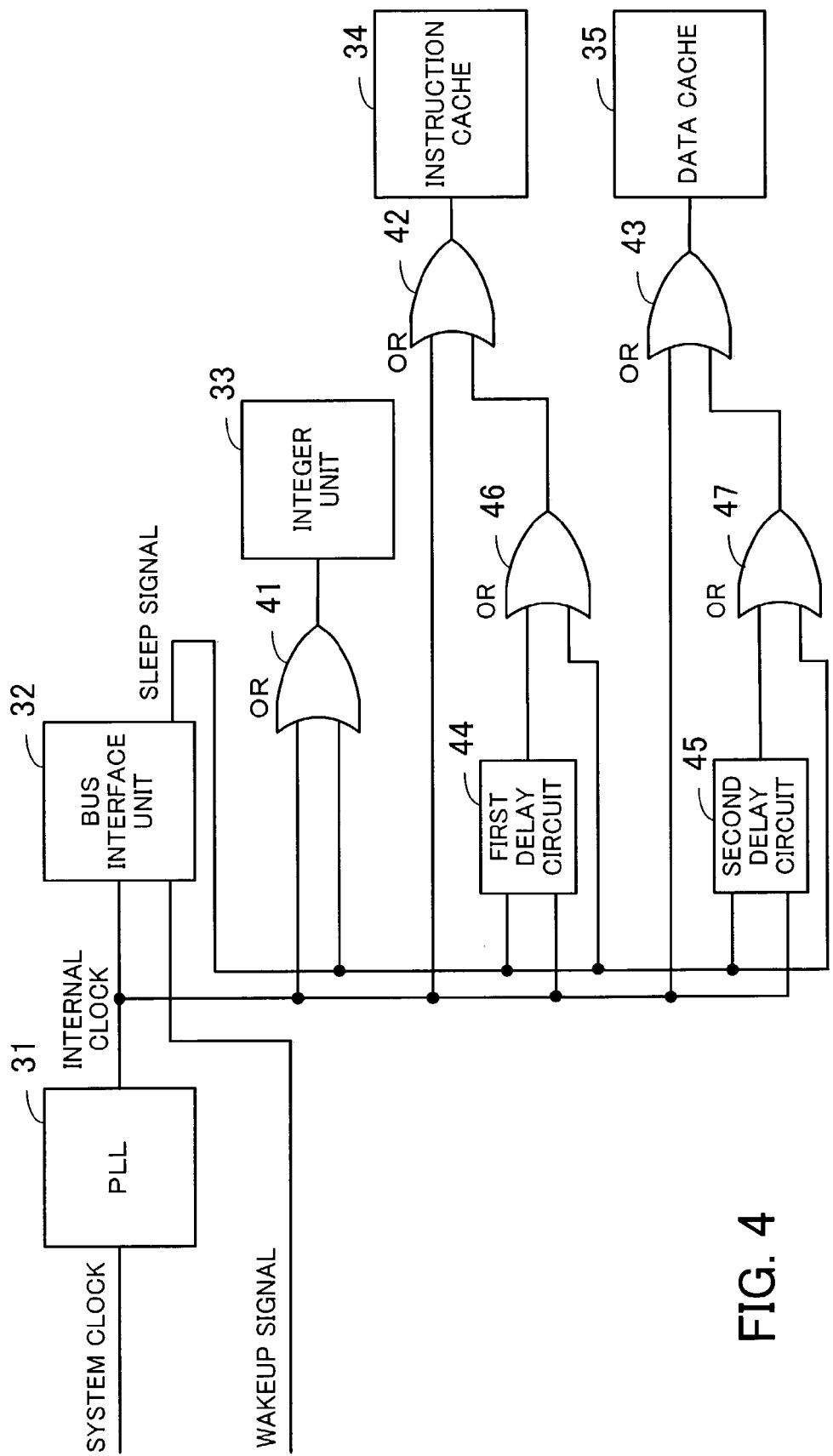
FIG. 4 is a diagram illustrating an exemplary circuit configuration of a microprocessor according to a second embodiment.

FIG. 4 illustrates an exemplary circuit configuration of a microprocessor according to the second embodiment. As shown in FIG. 4, the microprocessor includes a PLL 31, a bus interface unit 32, an integer unit 33, an instruction cache 34, and a data cache 35. Functions of these circuits are identical with those of the respective circuits of the first embodiment shown in FIG. 1.

The PLL 31 is input with the system clock signal, and outputs the internal clock signal, which is supplied to the bus interface unit 32. The internal clock signal output from the PLL 31 is also supplied to three OR gates 41 to 43, a first delay circuit 44 and a second delay circuit 45. The OR gates 41 to 43 are each a logic circuit for outputting a logical sum of input signals. The first and second delay circuits 44 and 45 each output an input signal after delaying the signal for a predetermined period, and have internal configurations identical to those of the first and second delay circuits 24 and 25, respectively, of the first embodiment shown in FIG. 2.

The bus interface unit 32 is further input with the wakeup signal and outputs the sleep signal. The sleep signal is a high-active signal and is supplied to the OR gate 41, the first and second delay circuits 44 and 45, and OR gates 46 and 47. The OR gates 46 and 47 are each a logic circuit for outputting a logical sum of input signals.

The output of the OR gate 41 is supplied to the integer unit 33. The output of the first delay circuit 44 is supplied to the OR gate 46, the output of which is supplied to the OR gate 42. The output of the OR gate 42 is supplied to the instruction cache 34. The output of the second delay circuit 45 is supplied to the OR gate 47 whose output is supplied to the OR gate 43. The output of the OR gate 43 is supplied to the data cache 35.

In the microprocessor configured as described above, the system clock signal is continuously input to the PLL 31 from outside. The PLL 31 outputs the internal clock signal with a predetermined frequency based on the system clock signal. Also, the bus interface unit 32 of the microprocessor is supplied with the wakeup signal which specifies an operation mode. The level of the wakeup signal is normally maintained at high level. When the operation mode of the processor is to be switched from the sleep mode to the normal operation mode, the wakeup signal is asserted (set to low level) for a predetermined period.

The following describes operations of the individual circuits when the operation mode of the microprocessor is switched from the sleep mode to the normal operation mode.

If the wakeup signal is asserted for the predetermined period, the sleep signal is negated (set to low level) by the bus interface unit 32. At this time, the OR gate 41 is supplied with the low-level sleep signal and the internal clock signal output from the PLL 31. As a result, the internal clock signal is output from the OR gate 41 and supplied to the integer unit 33.

Also, when the sleep signal is negated, the first delay circuit 44 is supplied with the low-level sleep signal and the internal clock signal output from the PLL 31. The first delay circuit 44 negates its output signal after a lapse of a time corresponding to one cycle of the internal clock signal from the negation of the sleep signal. Thus, the OR gate 46 is supplied with the low-level output of the first delay circuit 44 and the low-level sleep signal, so that a low-level signal is output from the OR gate 46. Accordingly, the OR gate 42 is supplied with the internal clock signal and the low-level signal. As a result, the internal clock signal is output from the OR gate 42 after a lapse of one clock cycle from the negation of the sleep signal and is supplied to the instruction cache 34.

Further, when the sleep signal is negated, the second delay circuit 45 is supplied with the low-level sleep signal and the internal clock signal output from the PLL 31. The second delay circuit 45 negates its output signal after a lapse of a time corresponding to two cycles of the internal clock signal from the negation of the sleep signal. Thus, the OR gate 47 is supplied with the low-level output of the second delay circuit 45 and the low-level sleep signal, so that a low-level signal is output from the OR gate 47. Accordingly, the OR gate 43 is supplied with the internal clock signal and the low-level signal. As a result, the internal clock signal is output from the OR gate 43 after a lapse of two clock cycles from the negation of the sleep signal and is supplied to the data cache 35.

In this manner, when the operation mode is switched to the normal operation mode, the internal clock signal can be supplied, to the integer unit 33, the instruction cache 34 and the data cache 35 in a manner staggered in time by one clock cycle each.

The following describes operations of the individual circuits when the operation mode of the microprocessor is switched from the normal operation mode to the sleep mode.

When the microprocessor is supplied with an input indicating transition to the sleep mode ("1" is set in the sleep mode register), the sleep signal is asserted by the bus interface unit 32. At this time, the OR gate 41 is supplied with the high-level sleep signal and the internal clock signal output from the PLL 31. As a result, the high-level sleep signal is output from the OR gate 41 and supplied to the integer unit 33.

Also, when the sleep signal is asserted, the first delay circuit 44 is supplied with the high-level sleep signal and the internal clock signal output from the PLL 31. The first delay circuit 44 asserts its output signal after a lapse of a time corresponding to one cycle of the internal clock signal from the assertion of the sleep signal. On the other hand, the OR gate 46 is supplied with the high-level sleep signal as soon as the sleep signal is asserted. Accordingly, the OR gate 46 starts to output a high-level signal immediately after the assertion of the sleep signal regardless of the output of the first delay circuit 44, so that the OR gate 42 is supplied with the internal clock signal and the high-level sleep signal immediately after the assertion of the sleep signal. As a result, a high-level signal is output from the OR gate 42 immediately after the assertion of the sleep signal and is supplied to the instruction cache 34.

Further, when the sleep signal is asserted, the second delay circuit 45 is supplied with the high-level sleep signal and the internal clock signal output from the PLL 31. The second delay circuit 45 asserts its output signal after a lapse of a time corresponding to two cycles of the internal clock signal from the assertion of the sleep signal. On the other hand, the OR gate 47 is supplied with the high-level sleep signal as soon as the sleep signal is asserted. Accordingly, the OR gate 47 starts to output a high-level signal immediately after the assertion of the sleep signal regardless of the output of the second delay circuit 45, so that the OR gate 43 is supplied with the internal clock signal and the high-level sleep signal immediately after the assertion of the sleep signal. As a result, a high-level signal is output from the OR gate 43 immediately after the assertion of the sleep signal and is supplied to the data cache 35.

Thus, at the time of transition from the sleep mode to the normal operation mode, the supply of the internal clock signal to the individual circuits can be started at different timings, and at the time of transition from the normal operation mode to the sleep mode, the supply of the internal clock signal to the individual circuits can be stopped at the same time.

[Third Embodiment]

According to a third embodiment, the present invention is applied to a microprocessor using a two-phase clock as its internal clock.

Figure 5:
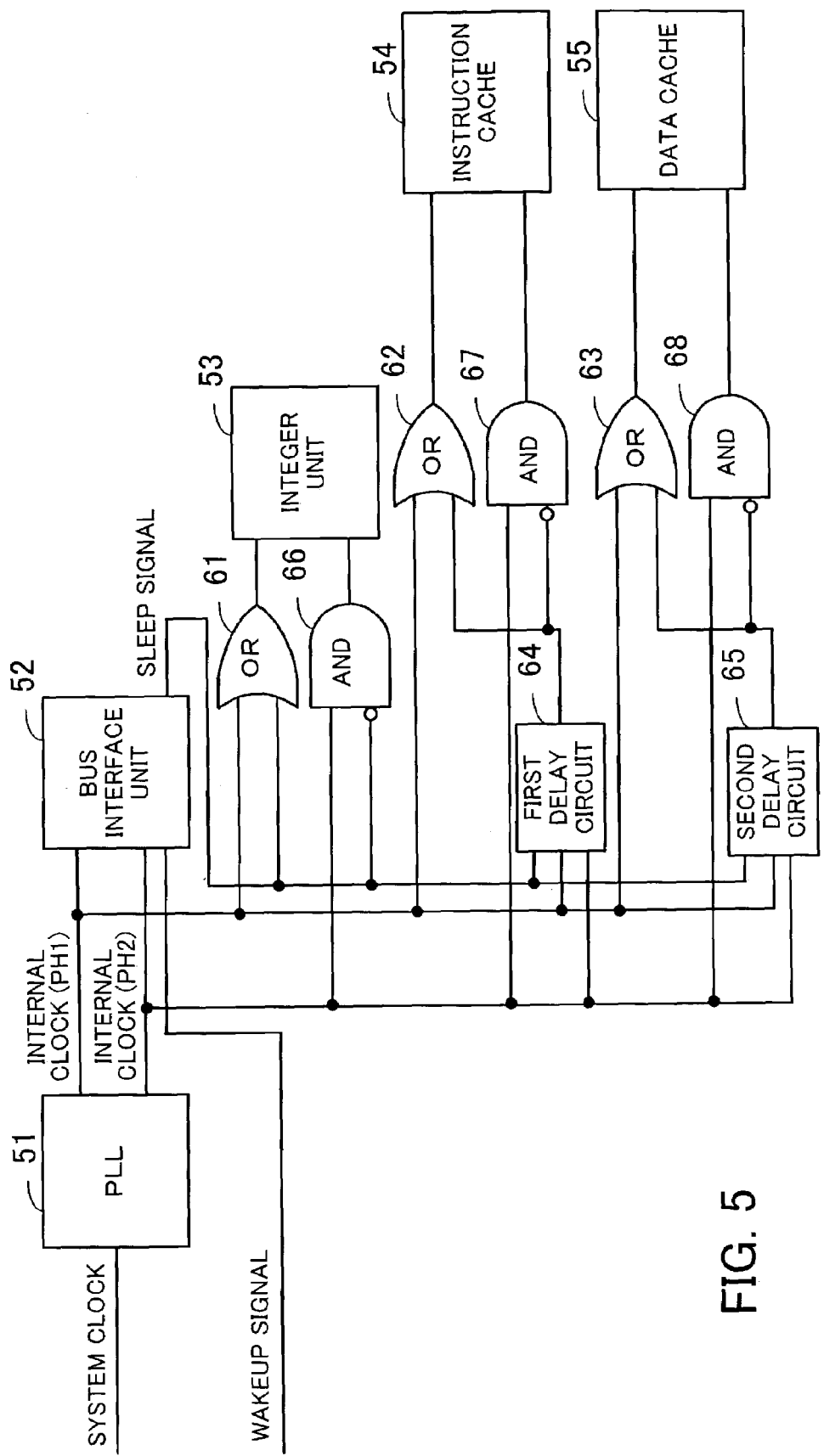
FIG. 5 is a diagram illustrating an exemplary circuit configuration of a microprocessor according to a third embodiment.

FIG. 5 illustrates an exemplary circuit configuration of a microprocessor according to the third embodiment. As shown in FIG. 5, the microprocessor includes a PLL 51, a bus interface unit 52, an integer unit 53, an instruction cache 54, and a data cache 55. Functions of these circuits are almost identical with those of the respective circuits of the first embodiment shown in FIG. 1, except that the PLL 51 in FIG. 5 generates a two-phase clock signal. Also, internal circuits of the bus interface unit 52, integer unit 53, instruction cache 54 and data cache 55 operate in accordance with the two-phase clock signal.

The PLL 51 is input with the system clock signal, and outputs a two-phase internal clock signal (PH1, PH2), which is supplied to the bus interface unit 52. The internal clock signal PH1 output from the PLL 51 is supplied to three OR gates 61 to 63, a first delay circuit 64 and a second delay circuit 65. The internal clock signal PH2 output from the PLL 51 is supplied to three AND gates 66 to 68 and the first and second delay circuits 64 and 65.

The first and second delay circuits 64 and 65 each output an input signal after delaying the signal for a predetermined period. The first delay circuit 64 delays change of the input sleep signal for a time corresponding to one cycle of the internal clock signal, while the second delay circuit 65 delays change of the input sleep signal for a time corresponding to two cycles of the internal clock signal.

The bus interface unit 52 is further input with the wakeup signal and outputs the sleep signal. The sleep signal, which is a high-active signal, is supplied to the OR gate 61, the first and second delay circuits 64 and 65, and the AND gate 66.

The output of the OR gate 61 is supplied to the integer unit 53. The output of the first delay circuit 64 is supplied to the OR gate 62, as well as to the AND gate 67 after being inverted. The outputs of the OR gate 62 and AND gate 67 are supplied to the instruction cache 54. The output of the second delay circuit 65 is supplied to the OR gate 63, as well as to the AND gate 68 after being inverted. The outputs of the OR gate 63 and AND gate 68 are supplied to the data cache 55.

The following describes operations of the individual circuits when the operation mode of the microprocessor is switched from the sleep mode to the normal operation mode.

If the wakeup signal is asserted (set to low level) for the predetermined period, the sleep signal is negated by the bus interface unit 52. At this time, the OR gate 61 is supplied with the low-level sleep signal and the internal clock signal (PH1) output from the PLL 51. As a result, the internal clock signal (PH1) is output from the OR gate 61 and supplied to the integer unit 53. Also, the AND gate 66 is supplied with an inverted signal (i.e., high-level signal) of the low-level sleep signal, as well as with the internal clock signal (PH2). As a result, the internal clock signal (PH2) is output from the AND gate 66 and supplied to the integer unit 53.

Also, when the sleep signal is negated, the first delay circuit 64 is supplied with the low-level sleep signal and the two-phase internal clock signal (PH1, PH2) output from the PLL 51. The first delay circuit 64 negates its output signal after a lapse of a time corresponding to one cycle of the internal clock signal from the negation of the sleep signal. As a result, the internal clock signal (PH1) is output from the OR gate 62 after a lapse of one clock cycle from the negation of the sleep signal and is supplied to the instruction cache 54. Also, after a lapse of one clock cycle from the negation of the sleep signal, the internal clock signal (PH2) is output from the AND gate 67 and supplied to the instruction cache 54.

Further, when the sleep signal is negated, the second delay circuit 65 is supplied with the low-level sleep signal and the internal clock signal (PH1, PH2) output from the PLL 51. The second delay circuit 65 negates its output signal after a lapse of a time corresponding to two cycles of the internal clock signal from the negation of the sleep signal. As a result, the internal clock signal (PH1) is output from the OR gate 63 after a lapse of two clock cycles from the negation of the sleep signal and is supplied to the data cache 55. Also, after a lapse of two clock cycles from the negation of the sleep signal, the internal clock signal (PH2) is output from the AND gate 68 and supplied to the data cache 55.

In this manner, when the operation mode is switched to the normal operation mode, the internal clock signal (PH1, PH2) can be supplied to the integer unit 53, the instruction cache 54 and the data cache 55 in a manner staggered in time by one clock cycle each.

The following describes operations of the individual circuits when the operation mode of the microprocessor is switched from the normal operation mode to the sleep mode.

When the microprocessor is supplied with an input indicating transition to the sleep mode ("1" is set in the sleep mode register), the sleep signal is asserted by the bus interface unit 52. At this time, the OR gate 61 is supplied with the high-level sleep signal and the internal clock signal (PH1) output from the PLL 51. As a result, a high-level signal is output from the OR gate 61 and supplied to the integer unit 53. Also, the AND gate 66 is supplied with an inverted signal of the high-level sleep signal and the internal clock signal (PH2) output from the PLL 51. As a result, a low-level signal is output from the AND gate 66 and supplied to the integer unit 53.

Also, when the sleep signal is asserted, the first delay circuit 64 is supplied with the high-level sleep signal and the internal clock signal (PH1, PH2) output from the PLL 51. The first delay circuit 64 asserts its output signal after a lapse of a time corresponding to one cycle of the internal clock signal from the assertion of the sleep signal. As a result, a high-level signal is output from the OR gate 62 after a lapse of one clock cycle from the assertion of the sleep signal and is supplied to the instruction cache 54. Also, after a lapse of one clock cycle from the assertion of the sleep signal, a low-level signal is output from the AND gate 67 and supplied to the instruction cache 54.

Further, when the sleep signal is asserted, the second delay circuit 65 is supplied with the high-level sleep signal and the internal clock signal (PH1, PH2) output from the PLL 51. The second delay circuit 65 asserts its output signal after a lapse of a time corresponding to two cycles of the internal clock signal from the assertion of the sleep signal. As a result, a high-level signal is output from the OR gate 63 after a lapse of two clock cycles from the assertion of the sleep signal and is supplied to the data cache 55. Also, after a lapse of two clock cycles from the assertion of the sleep signal, a low-level signal is output from the AND gate 68 and supplied to the data cache 55.

In this manner, when the operation mode is switched to the sleep mode, the supply of the internal clock signal to the integer unit 53, the instruction cache 54 and the data cache 55 can be stopped in a manner staggered in time by one clock cycle each.

The first and second delay circuits 64 and 65 of the third embodiment can each be constituted, for example, by a multi-stage latch circuit.

Figure 6:
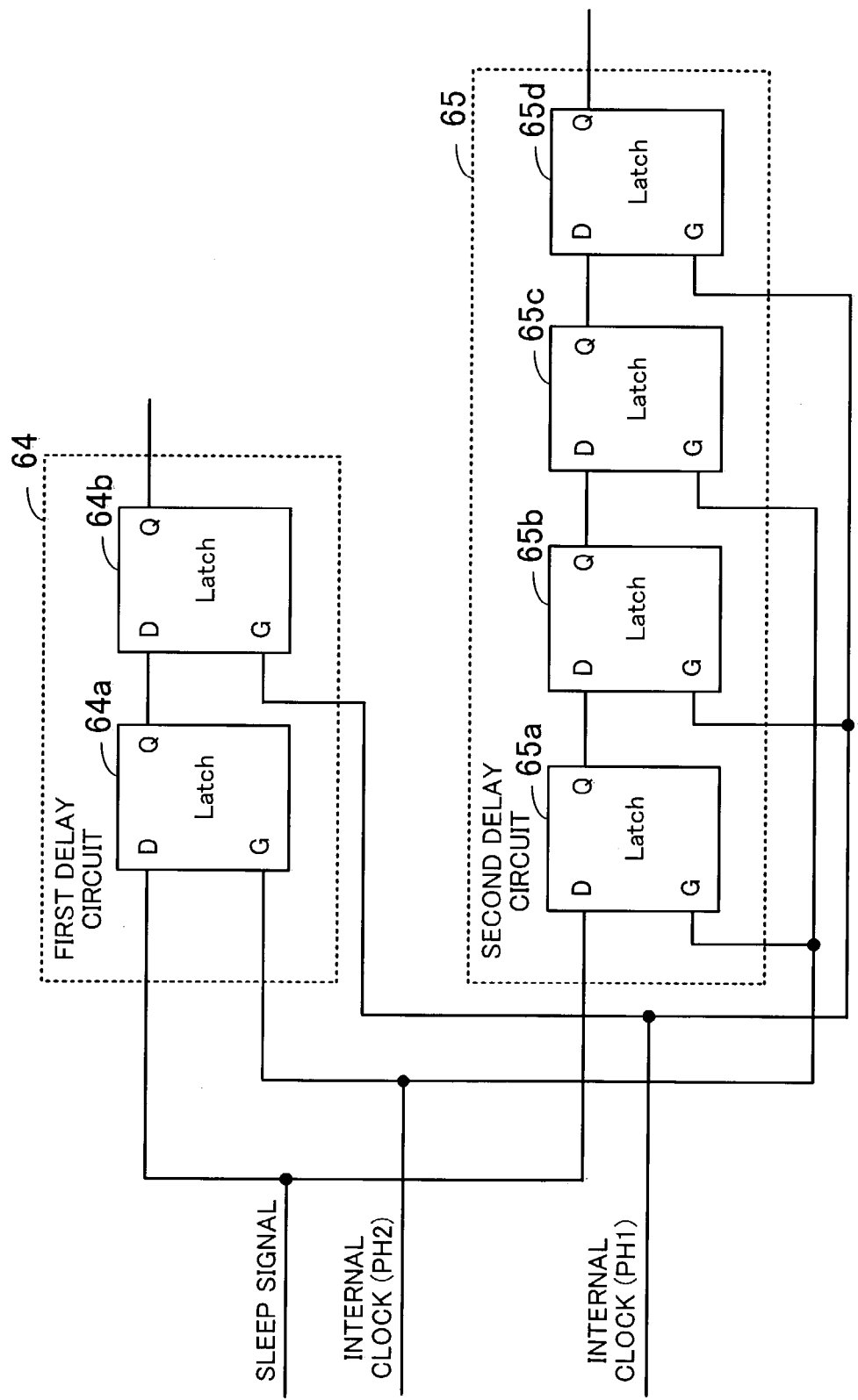
FIG. 6 is a diagram illustrating exemplary configurations of delay circuits according to the third embodiment.

FIG. 6 illustrates an exemplary configuration of the delay circuits of the third embodiment. The first and second delay circuits 64 and 65 are constituted by numbers of latches (twice the numbers of clock cycles to be delayed) corresponding to their respective delay times. Specifically, the first delay circuit 64 is constituted by two latches 64a and 64b, and the second delay circuit 65 is constituted by four latches 65a to 65d. The latches 64a, 64b and 65a to 65d each comprise a circuit called D (delay) latch. In the D latch, when the input to the G terminal is at high level, the signal input to the D terminal is passed to the Q terminal, and when the input to the G terminal is at low level, the data flow is shut off and the previous output is maintained.

In the first delay circuit 64, the sleep signal and the internal clock signal (PH2) are input to the D and G terminals, respectively, of the first-stage latch 64a. The Q terminal of the latch 64a is connected to the D terminal of the second-stage latch 64b. The latch 64b is input with the internal clock signal (PH1) at the G terminal, and provides an output, as the output of the first delay circuit 64, from the Q terminal to the OR gate 62 and the AND gate 67 shown in FIG. 5.

In the second delay circuit 65, the sleep signal and the internal clock signal (PH2) are input to the D and G terminals, respectively, of the first-stage latch 65a. The Q terminal of the latch 65a is connected to the D terminal of the second-stage latch 65b. The latch 65b is input with the internal clock signal (PH1) at the G terminal, and has the Q terminal connected to the D terminal of the third-stage latch 65c. The latch 65c is input with the internal clock signal (PH2) at the G terminal, and has the Q terminal connected to the D terminal of the fourth-stage latch 65d. The latch 65d is input with the internal clock signal (PH1) at the G terminal, and provides an output, as the output of the second delay circuit 65, from the Q terminal to the OR gate 63 and the AND gate 68 shown in FIG. 5.

With the first delay circuit 64 configured as described above, when the sleep signal output changes, the output change of the sleep signal is reflected in the output of the first delay circuit 64 after a lapse of a time corresponding to one cycle of the internal clock signal. Also, with the second delay circuit 65, when the sleep signal output changes, the output change of the sleep signal is reflected in the output of the second delay circuit 65 after a lapse of a time corresponding to two cycles of the internal clock signal.

Let it be assumed, for example, that the sleep signal changes from high level to low level (the operation mode switches from the sleep mode to the normal operation mode). While the sleep signal is at high level, the outputs from the Q terminals of the latches 64a, 64b and 65a to 65d are all at high level.

After the sleep signal changes to low level, the outputs from the Q terminals of the first-stage latches 64a and 65a turn to low level when the internal clock signal (PH2) turns to high level. Subsequently, when the internal clock signal (PH1) turns to high level, the outputs from the Q terminals of the second-stage latches 64b and 65b turn to low level. Consequently, a low-level signal is output from the first delay circuit 64.

When the internal clock signal (PH2) turns to high level thereafter, the output from the Q terminal of the third-stage latch 65c turns to low level. Subsequently, when the internal clock signal (PH1) turns to high level, the output from the Q terminal of the fourth-stage latch 65d turns to low level. As a consequence, a low-level signal is output from the second delay circuit 65.

In this manner, the sleep signal can be delayed by the individual delay circuits. When the sleep signal changes from low level to high level (the operation mode switches from the normal operation mode to the sleep mode), the signal is passed on in a similar manner.

Figure 7:
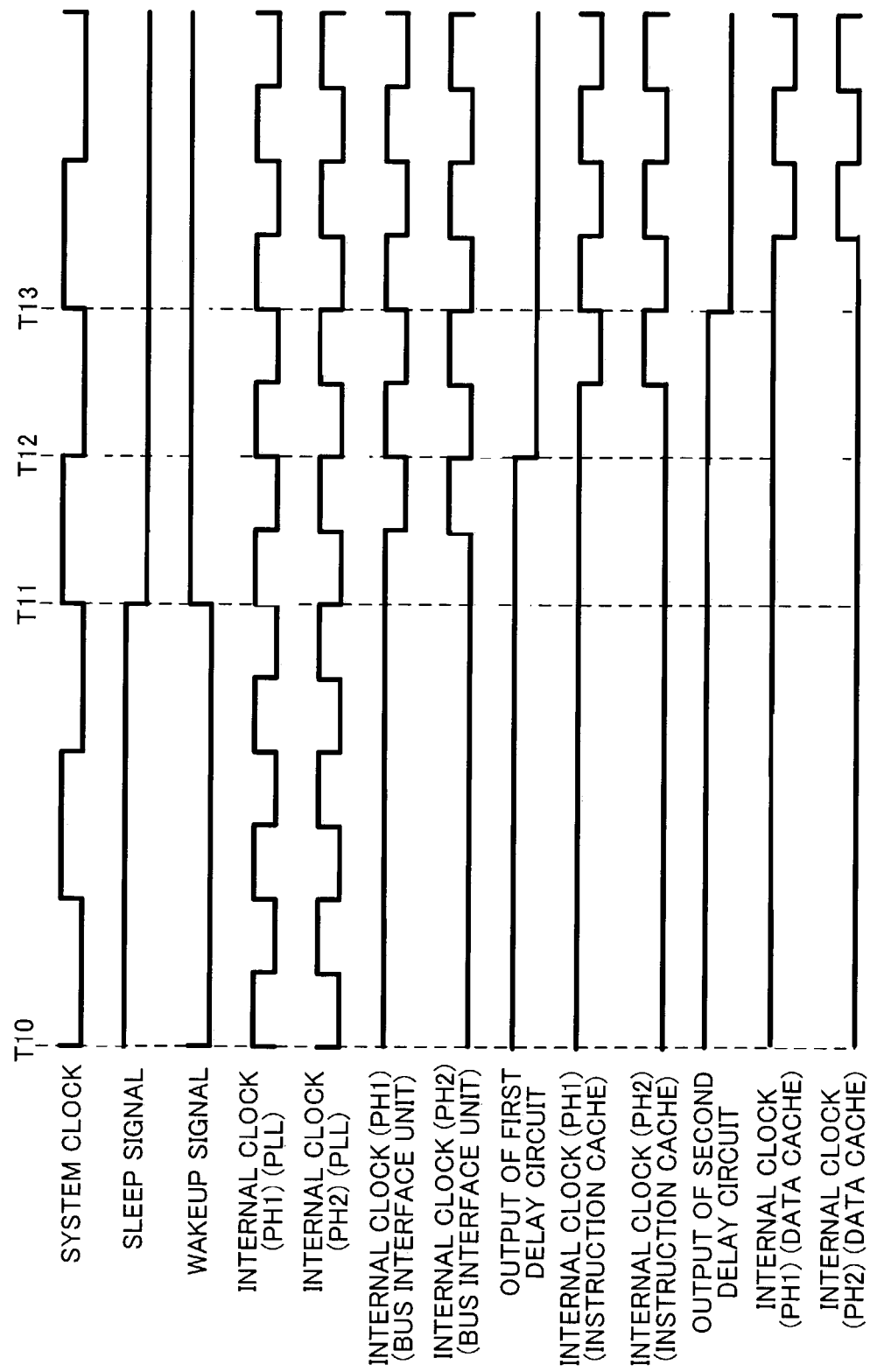
FIG. 7 is a timing chart of the microprocessor according to the third embodiment.

FIG. 7 is a timing chart of the microprocessor according to the third embodiment. In FIG. 7 are illustrated, from the top downward, the system clock signal, the sleep signal, the wakeup signal, the internal clock signal (PH1) of the PLL 51, the internal clock signal (PH2) of the PLL 51, the internal clock signal (PH1) of the bus interface unit 52, the internal clock signal (PH2) of the bus interface unit 52, the output of the first delay circuit 64, the internal clock signal (PH1) of the instruction cache 54, the internal clock signal (PH2) of the instruction cache 54, the output of the second delay circuit 65, the internal clock signal (PH1) of the data cache 55, and the internal clock signal (PH2) of the data cache 55. The internal clock signal (PH1, PH2) supplied to the integer unit 53 is identical with the internal clock signal (PH1, PH2) of the bus interface unit 52.

In the example shown in FIG. 7, the cycle of the internal clock signal (PH1, PH2) of the PLL 51 is half the cycle of the system clock signal. The internal clock signal (PH1) of the PLL 51 is exactly opposite in phase (shifted by 180 degrees) with respect to the internal clock signal (PH2) of the PLL 51. It is also assumed that before time T11, the operation mode of the microprocessor is set in the sleep mode. The wakeup signal is at high level except when the microprocessor is supplied with an input indicating transition to the normal operation mode. During the sleep mode, the internal clock signal (PH2) of the bus interface unit 52, the internal clock signal (PH2) of the instruction cache 54 and the internal clock signal (PH2) of the data cache 55 are at low level. Also, during the sleep mode, the sleep signal, the internal clock signal (PH1) of the bus interface unit 52, the output of the first delay circuit 64, the internal clock signal (PH1) of the instruction cache 54, the output of the second delay circuit 65 and the internal clock signal (PH1) of the data cache 55 are at high level.

At time T10, the level of the wakeup signal is changed from high to low. If this state continues for a time corresponding to two cycles of the system clock signal, the bus interface unit 52 recognizes the instruction to switch to the normal operation mode.

At time T11, the level of the wakeup signal is changed from low to high (asserted), and simultaneously with this, the level of the sleep signal is changed from high to low (negated) by the bus interface unit 52. Also, the internal clock signal (PH1, PH2) of the bus interface unit 52 turns into a signal identical with the internal clock signal (PH1, PH2) from the PLL 51. At this point of time, the outputs of the first and second delay circuits 64 and 65 remain at high level, and accordingly, the internal clock signal (PH1, PH2) of the instruction cache 54 and the internal clock signal (PH1, PH2) of the data cache 55 remain unchanged.

At time T12, the output of the first delay circuit 64 changes to low level, whereupon the internal clock signal (PH1, PH2) of the instruction cache 54 turns into a signal identical with the internal clock signal (PH1, PH2) from the PLL 51. At this point of time, the output of the second delay circuit 65 still remains at high level, and accordingly, the internal clock signal (PH1, PH2) of the data cache 55 remains unchanged.

At time T13, the output of the second delay circuit 65 changes to low level, whereupon the internal clock signal (PH1, PH2) of the data cache 55 turns into a signal identical with the internal clock signal from the PLL 51.

[Fourth Embodiment]

According to a fourth embodiment, the present invention is applied to a microprocessor using a two-phase clock as its internal clock, and also the timing for supplying the internal clock signal is delayed only at the time of transition to the normal operation mode.

Figure 8:
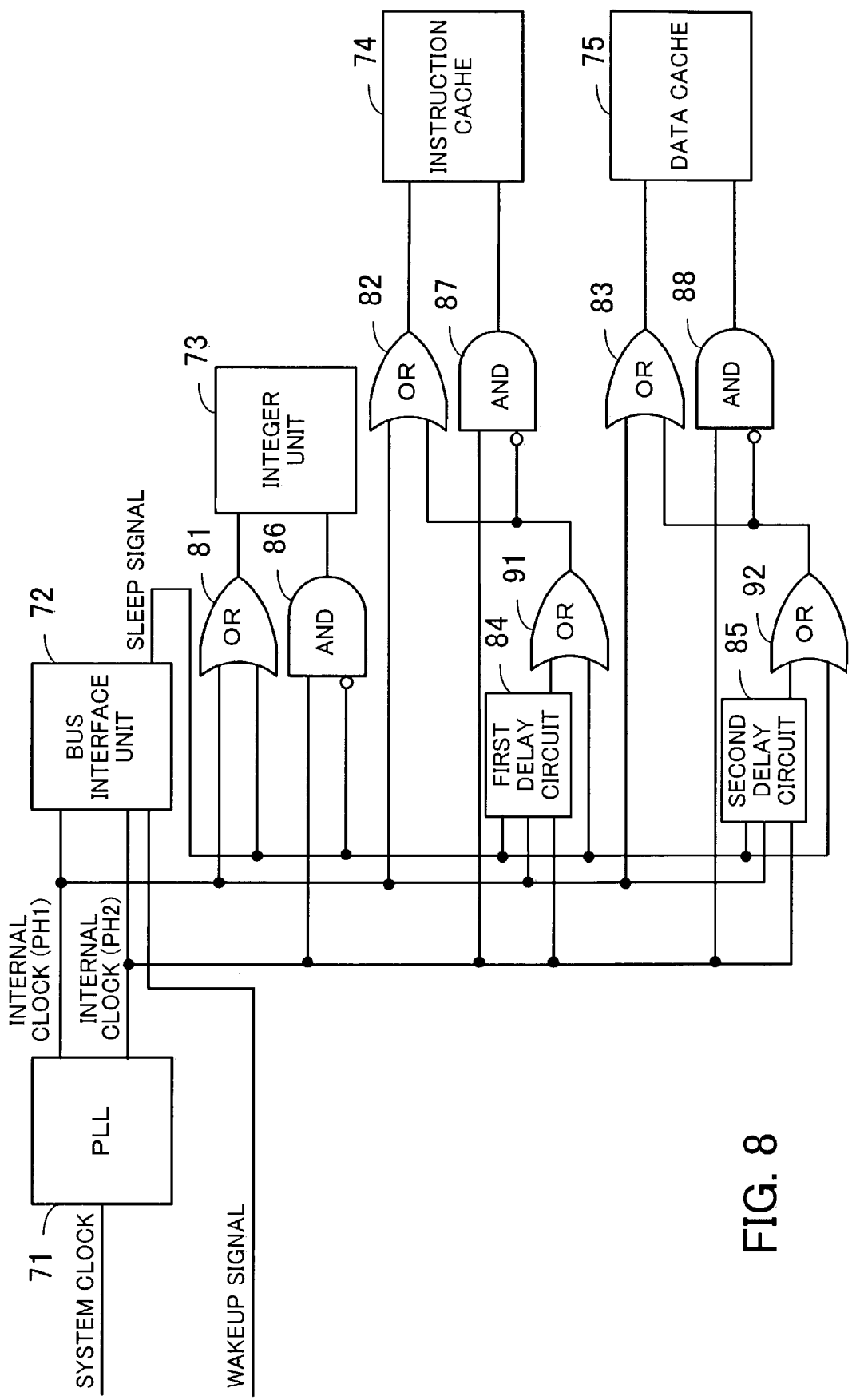
FIG. 8 is a diagram illustrating an exemplary circuit configuration of a microprocessor according to a fourth embodiment.
Figure 9:
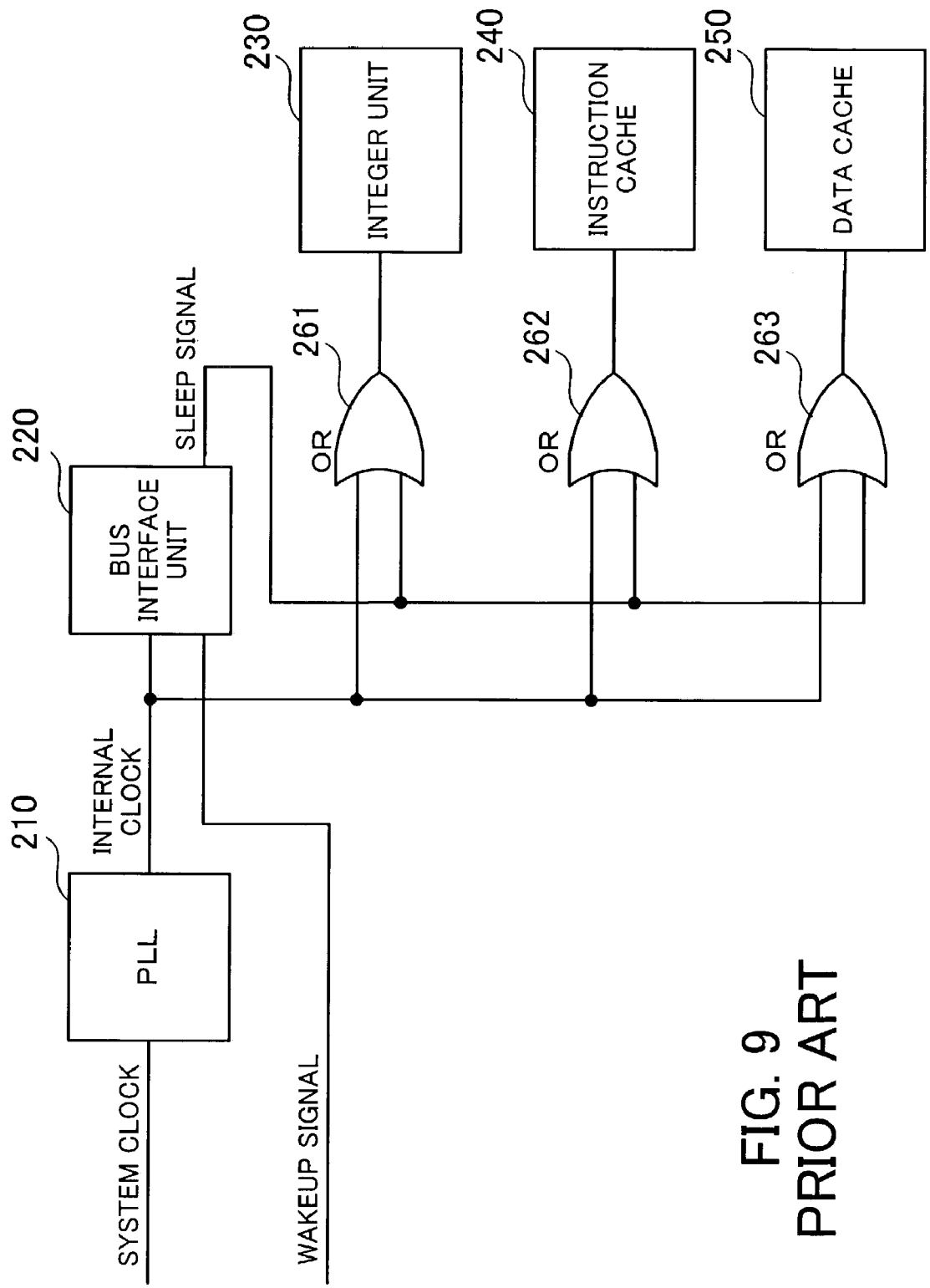
FIG. 9 is a diagram illustrating an exemplary configuration of a conventional microprocessor.

FIG. 8 illustrates an exemplary circuit configuration of a microprocessor according to the fourth embodiment. As shown in FIG. 8, the microprocessor includes a PLL 71, a bus interface unit 72, an integer unit 73, an instruction cache 74, and a data cache 75. Functions of these circuits are identical with those of the respective circuits of the third embodiment shown in FIG. 5.

The PLL 71 is input with the system clock signal, and outputs the two-phase internal clock signal (PH1, PH2), which is supplied to the bus interface unit 72. Also, the internal clock signal PH1 output from the PLL 71 is supplied to three OR gates 81 to 83, a first delay circuit 84 and a second delay circuit 85. The internal clock signal PH2 output from the PLL 71 is supplied to three AND gates 86 to 88 and the first and second delay circuits 84 and 85.

The first and second delay circuits 84 and 85 each output an input signal after delaying the signal for a predetermined period. The first delay circuit 84 delays change of the input sleep signal for a time corresponding to one cycle of the internal clock signal, while the second delay circuit 85 delays change of the input sleep signal for a time corresponding to two cycles of the internal clock signal.

The bus interface unit 72 is further input with the wakeup signal and outputs the sleep signal. The sleep signal is a high-active signal and is supplied to three OR gates 81, 91 and 92, the first and second delay circuits 84 and 85, and the AND gate 86.

The output of the OR gate 81 is supplied to the integer unit 73. The output of the first delay circuit 84 is supplied to the OR gate 91, of which the output is supplied to the OR gate 82 as well as to the AND gate 87 after being inverted. The outputs of the OR gate 82 and AND gate 87 are supplied to the instruction cache 74. The output of the second delay circuit 85 is supplied to the OR gate 92, the output of which is supplied to the OR gate 83 as well as to the AND gate 88 after being inverted. The outputs of the OR gate 83 and AND gate 88 are supplied to the data cache 75.

The following describes operations of the individual circuits when the operation mode of the microprocessor is switched from the sleep mode to the normal operation mode.

If the wakeup signal is asserted for the predetermined period, the sleep signal is negated by the bus interface unit 72. At this time, the OR gate 81 is supplied with the low-level sleep signal and the internal clock signal (PH1) output from the PLL 71. As a result, the internal clock signal (PH1) is output from the OR gate 81 and supplied to the integer unit 73. Also, the AND gate 86 is supplied with an inverted signal (i.e., high-level signal) of the low-level sleep signal, as well as with the internal clock signal (PH2). As a result, the internal clock signal (PH2) is output from the AND gate 86 and supplied to the integer unit 73.

Also, when the sleep signal is negated, the first delay circuit 84 is supplied with the low-level sleep signal and the two-phase internal clock signal (PH1, PH2) output from the PLL 71. The first delay circuit 84 negates its output signal after a lapse of a time corresponding to one cycle of the internal clock signal from the negation of the sleep signal. Since the sleep signal supplied to the OR gate 91 from the bus interface unit 72 is also at low level, the output of the OR gate 91 is negated after a lapse of one cycle of the internal clock signal from the negation of the sleep signal. As a result, the internal clock signal (PH1) is output from the OR gate 82 after a lapse of one clock cycle from the negation of the sleep signal and is supplied to the instruction cache 74. Also, after a lapse of one clock cycle from the negation of the sleep signal, the internal clock signal (PH2) is output from the AND gate 87 and supplied to the instruction cache 74.

Further, when the sleep signal is negated, the second delay circuit 85 is supplied with the low-level sleep signal and the internal clock signal (PH1, PH2) output from the PLL 71. The second delay circuit 85 negates its output signal after a lapse of a time corresponding to two cycles of the internal clock signal from the negation of the sleep signal. Since the sleep signal supplied to the OR gate 92 from the bus interface unit 72 is also at low level, the output of the OR gate 92 is negated after a lapse of two cycles of the internal clock signal from the negation of the sleep signal. As a result, the internal clock signal (PH1) is output from the OR gate 83 after a lapse of two clock cycles from the negation of the sleep signal and is supplied to the data cache 75. Also, after a lapse of two clock cycles from the negation of the sleep signal, the internal clock signal (PH2) is output from the AND gate 88 and supplied to the data cache 75.

In this manner, when the operation mode is switched to the normal operation mode, the internal clock signal (PH1, PH2) can be supplied to the integer unit 73, the instruction cache 74 and the data cache 75 in a manner staggered in time by one clock cycle each.

The following describes operations of the individual circuits when the operation mode of the microprocessor is switched from the normal operation mode to the sleep mode.

When the microprocessor is supplied with an input indicating transition to the sleep mode ("1" is set in the sleep mode register), the sleep signal is asserted by the bus interface unit 72. At this time, the OR gate 81 is supplied with the high-level sleep signal and the internal clock signal (PH1) output from the PLL 71. As a result, a high-level signal is output from the OR gate 81 and supplied to the integer unit 73. Also, the AND gate 86 is supplied with an inverted signal of the high-level sleep signal and the internal clock signal (PH2) output from the PLL 71. As a result, a low-level signal is output from the AND gate 86 and supplied to the integer unit 73.

Also, when the sleep signal is asserted, the first delay circuit 84 is supplied with the high-level sleep signal and the internal clock signal (PH1, PH2) output from the PLL 71. The first delay circuit 84 asserts its output signal after a lapse of a time corresponding to one cycle of the internal clock signal from the assertion of the sleep signal. On the other hand, the sleep signal supplied to the OR gate 91 from the bus interface unit 72 is also at high level, and accordingly, the output of the OR gate 91 is negated (set to high level) simultaneously with the assertion of the sleep signal. As a result, a high-level signal is output from the OR gate 82 immediately after the assertion of the sleep signal and is supplied to the instruction cache 74. Also, immediately after the assertion of the sleep signal, a low-level signal is output from the AND gate 87 and supplied to the instruction cache 74.

Further, when the sleep signal is asserted, the second delay circuit 85 is supplied with the high-level sleep signal and the internal clock signal (PH1, PH2) output from the PLL 71. The second delay circuit 85 asserts its output signal after a lapse of a time corresponding to two cycles of the internal clock signal from the assertion of the sleep signal. On the other hand, the sleep signal supplied to the OR gate 92 from the bus interface unit 72 is also at high level, and accordingly, the output of the OR gate 92 is negated (set to high level) simultaneously with the assertion of the sleep signal. As a result, a high-level signal is output from the OR gate 83 immediately after the assertion of the sleep signal and is supplied to the data cache 75. Also, immediately after the assertion of the sleep signal, a low-level signal is output from the AND gate 88 and supplied to the data cache 75.

In this manner, when the operation mode is switched to the sleep mode, the supply of the internal clock signal (PH1, PH2) to the integer unit 73, the instruction cache 74 and the data cache 75 can be stopped simultaneously with the output of the sleep signal.

The first and second delay circuits 84 and 85 of the fourth embodiment have internal configurations identical with those of the delay circuits of the third embodiment shown in FIG. 6.

[Other Modifications]

In the foregoing embodiments, the timing for starting the supply of the internal clock signal to the individual circuits is staggered by a time corresponding to one cycle of the internal clock signal, but the width of time interval for staggering the supply start timing may be changed. For example, the supply start timing and supply stop timing for the internal clock signal may individually be staggered by two clock cycles.

Also, at the time of transition from the normal operation mode to the sleep mode, the stop timing for the internal clock signal may be left unstaggered, and only at the time of transition from the sleep mode to the normal operation mode, the supply timing for the internal clock signal may be staggered.

As described above, according to the present invention, when the operations of a plurality of synchronous circuits are started or stopped, the supply of the internal clock signal to these synchronous circuits is started or stopped in a time-staggered manner, so that change in the current flowing through the plurality of synchronous circuits can be lessened, thus restraining the production of noise. As a consequence, the microprocessor can be operated stably.

The foregoing is considered as illustrative only of the principles of the present invention. Further, since numerous modifications and changes will readily occur to those skilled in the arts it is not desired to limit the invention to the exact construction and applications shown and described, and accordingly, all suitable modifications and equivalents may be regarded as falling within the scope of the invention in the appended claims and their equivalents.

What is claimed is:

1. A microprocessor having an operation mode switching function, comprising:
    a clock generator circuit for generating a clock signal;
    a first synchronous circuit operative in synchronism with a first clock signal given thereto;
    a second synchronous circuit operative in synchronism with a second clock signal given thereto;
    a third synchronous circuit operative in synchronism with a third clock signal given thereto;
    a sleep signal generating circuit that produces a sleep signal depending on the operation mode of the microprocessor;
    a first delay circuit that delays the sleep signal for a first delay time, thereby producing a first delayed sleep signal;
    a second delay circuit that delays the sleep signal for a second delay time greater than the first delay time, thereby producing a second delayed sleep signal;
    a first gate disposed between the clock generator circuit and the first synchronous circuit and coupled to the sleep signal generating circuit to produce and control the first clock signal, the first gate suppressing the first clock signal when the sleep signal is active;
    a second gate disposed between the clock generator circuit and the second synchronous circuit and coupled to the first delay circuit to produce and control the second clock signal, the second gate suppressing the second clock signal when the first delayed sleep signal is active; and
    a third gate disposed between the clock generator and the third synchronous circuit and coupled to the second delay circuit to produce and control the third clock signal, the third gate suppressing the third clock signal when the second delayed sleep signal is active.

2. The microprocessor according to claim 1, wherein said first and second delay circuits comprise a number of flip-flops corresponding to the first and second delay times, respectively.

3. The microprocessor according to claim 1, wherein said first and second delay circuits comprise a number of latches corresponding to the first and second delay times, respectively.

4. The microprocessor according to claim 1, wherein:
    said first synchronous circuit includes an arithmetic circuit;
    said second synchronous circuit includes an instruction cache; and
    said third synchronous circuit includes a data cache.

5. The microprocessor according to claim 1, wherein said clock generator circuit comprises a PLL (Phase Locked Loop) circuit.

* * * * *